US010994707B2

(12) United States Patent
Street et al.

(10) Patent No.: US 10,994,707 B2
(45) Date of Patent: *May 4, 2021

(54) POSITION AND FORCE SENSOR ASSEMBLY FOR VEHICLE BRAKE PEDAL

(71) Applicant: CTS Corporation, Lisle, IL (US)

(72) Inventors: Steven J. Street, Glen Ellyn, IL (US); Mike Smith, Warwickshire (GB)

(73) Assignee: CTS Corporation, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/871,709

(22) Filed: May 11, 2020

(65) Prior Publication Data

US 2020/0391706 A1 Dec. 17, 2020

Related U.S. Application Data

(63) Continuation of application No. 16/439,822, filed on Jun. 13, 2019, now Pat. No. 10,654,452.

(51) Int. Cl.
*B60T 7/04* (2006.01)
*B60T 7/06* (2006.01)

(52) U.S. Cl.
CPC ............... *B60T 7/042* (2013.01); *B60T 7/06* (2013.01); *B60T 2220/04* (2013.01); *B60T 2270/82* (2013.01)

(58) Field of Classification Search
CPC ........ B60T 7/042; B60T 7/06; B60T 2220/04; B60T 2270/82
See application file for complete search history.

(56) References Cited

U.S. PATENT DOCUMENTS

| 6,105,737 A | 8/2000 | Weigert et al. |
| 6,213,572 B1 | 4/2001 | Linkner, Jr. et al. |
| 6,330,838 B1 | 12/2001 | Kalsi |

(Continued)

FOREIGN PATENT DOCUMENTS

| EP | 1055912 A2 | 11/2000 |
| EP | 1577184 A2 | 9/2005 |

(Continued)

OTHER PUBLICATIONS

Ams: New Magnetic Position Sensors for Automotive Applications Support Full ISO26262 Compliance and Provide SysteminPackage (SiP) Format. Business Wire—2016; https://dialog.proquest.com/professional/docview/1784083696/15CC904FA1C11CA0C95/123?accountid=157282.

*Primary Examiner* — Thomas C Diaz (74) *Attorney, Agent, or Firm* — Daniel Deneufbourg (57) ABSTRACT

A vehicle pedal sensor assembly for use in a vehicle brake pedal including a base and a pedal arm pivotally mounted to the pedal base. A sensor housing includes a non-contacting pedal position sensor and a contacting pedal force sensor. The sensor housing is mounted to the base of the vehicle brake pedal. A magnet is mounted to the pedal arm. The pedal position sensor senses a change in the magnitude and/or direction of the magnetic field generated by the magnet in response to a change in the position of the pedal arm for determining the position of the pedal arm. A pedal force application member exerts a force against the pedal force sensor in response to the change in the position of the pedal arm for determining the position of the pedal arm. The force sensor may be a piezoelectric element, a load cell, or a strain gauge.

7 Claims, 6 Drawing Sheets

(56) References Cited

U.S. PATENT DOCUMENTS

| | | | |
|---|---|---|---|
| 6,464,306 | B2 | 10/2002 | Shaw et al. |
| 6,531,667 | B2 | 3/2003 | Becker et al. |
| 6,577,119 | B1 | 6/2003 | Yaddehige |
| 6,591,710 | B1 * | 7/2003 | Shaw .................. G05G 1/30 123/399 |
| 6,619,039 | B2 | 9/2003 | Zehnder, II et al. |
| 7,198,336 | B2 | 4/2007 | Yamamoto et al. |
| 7,395,734 | B2 * | 7/2008 | Fujiwara ............. B60T 7/042 74/514 |
| 8,239,100 | B2 | 8/2012 | Ueno et al. |
| 8,305,073 | B2 | 11/2012 | Kather |
| 9,465,402 | B2 | 10/2016 | Kaiser |
| 9,539,993 | B2 | 1/2017 | Crombez et al. |
| 9,566,964 | B2 | 2/2017 | Jürgens |
| 9,582,025 | B2 | 2/2017 | Jayasuriya et al. |
| 9,631,918 | B2 | 4/2017 | Weiberle et al. |
| 9,651,634 | B2 | 5/2017 | Kang |
| 10,654,452 | B2 * | 5/2020 | Street .................. B60T 7/042 |
| 2004/0187625 | A1 | 9/2004 | Schiel et al. |
| 2007/0159126 | A1 | 7/2007 | Kanekawa et al. |
| 2008/0276749 | A1 | 11/2008 | Stewart et al. |
| 2016/0334829 | A1 * | 11/2016 | Kaijala ................ G05G 1/50 |
| 2017/0001615 | A1 | 1/2017 | Adler et al. |

FOREIGN PATENT DOCUMENTS

| | | | | |
|---|---|---|---|---|
| EP | 2871102 | A1 | 5/2015 | |
| GB | 2451559 | A | 2/2009 | |
| JP | 8150263 | A | 6/1996 | |
| JP | 2003261012 | A * | 9/2003 | ............. B60T 7/02 |
| WO | 2016/186979 | A1 | 11/2016 | |

\* cited by examiner

POSITION AND FORCE SENSOR ASSEMBLY FOR VEHICLE BRAKE PEDAL

CROSS-REFERENCE TO RELATED APPLICATIONS

This patent application is a continuation patent application that claims the priority and benefit of the filing date of co-pending U.S. patent application Ser. No. 16/439,822 filed on Jun. 13, 2019 which is a continuation of U.S. patent application Ser. No. 15/876,772 filed on Jan. 22, 2018, now U.S. Pat. No. 10,343,657 issued on Jul. 9, 2019, the disclosure and contents of which is expressly incorporated herein in its entirety by reference.

FIELD OF THE INVENTION

This invention relates to a position and force sensor assembly for a vehicle brake pedal.

BACKGROUND OF THE INVENTION

Brake-by-wire vehicle pedals use sensors that allow the position of the pedal to be determined for the purpose of applying and releasing the brakes of the vehicle.

The present invention is directed to a new sensor assembly and, more specifically, to a new position and force sensor assembly for use in a brake-by-wire vehicle brake pedal.

SUMMARY OF THE INVENTION

The present invention is generally directed to a vehicle pedal sensor assembly for use in a vehicle brake pedal including a base and a pedal arm pivotally mounted to the pedal base, the vehicle sensor assembly comprising a sensor housing including a non-contacting pedal position sensor and a contacting pedal force sensor, the sensor housing being mounted to the base of the vehicle brake pedal, a magnet mounted to the pedal arm in a relationship opposed and spaced from the pedal position sensor, the pedal position sensor being adapted for sensing a change in the magnitude and/or direction of the magnetic field generated by the magnet in response to a change in the position of the pedal arm for determining the position of the pedal arm, and a pedal force application member operably coupled to the pedal arm and adapted to exert a contact force against the pedal force sensor in response to the change in the position of the pedal arm for determining the position of the pedal arm.

In one embodiment, the pedal position sensor is a Hall-Effect sensor.

In one embodiment, the pedal force sensor is a piezoelectric element, a load cell, or a strain gauge.

In one embodiment, the sensor housing and the force sensor each define a through-hole, the force application member including a head and a elongate shaft, the head exerting the force against the force sensor, the force application member and the force sensor being mounted in a receptacle defined in the sensor housing and the shaft of the force application member extending through the through-hole defined in the force sensor, and further comprising a nut coupled to an end of the shaft for securing the force sensor in the sensor housing and applying a pre-load to the force sensor.

The present invention is also directed to a vehicle pedal sensor assembly for use in a vehicle brake pedal including a base and a pedal arm pivotally mounted to the pedal base, the vehicle sensor assembly comprising a sensor housing including a pedal position sensor and defining an interior receptacle for a pedal force sensor, the sensor housing being mounted to the base of the vehicle brake pedal, a magnet mounted to the pedal arm in a relationship opposed and spaced from the pedal position sensor, the pedal position sensor sensing a change in the magnitude and/or direction of the magnetic field generated by the magnet in response to a change in the position of the pedal arm for determining the position of the pedal arm, and a pedal force application member operably coupled to the pedal arm, the pedal force application member including a head extending into the receptacle in the sensor housing and in abutting contact with the pedal force sensor and adapted to exert a force against the pedal force sensor in response to the change in the position of the pedal arm for determining the position of the pedal arm.

In one embodiment, the pedal force sensor is in the form of a piezoelectric element, a load cell, or a strain gauge.

In one embodiment, the pedal force sensor defines a through-aperture, the pedal force application member including a shaft extending through the through-aperture defined in the pedal force sensor, and further comprising a nut secured to an end of the shaft for securing the pedal force sensor in the sensor housing and applying a pre-load to the pedal force sensor.

In one embodiment, the base of the vehicle brake pedal defines a through-hole, the sensor housing being located on a back side of the base of the vehicle brake pedal and the pedal force application member extending in the through-hole defined in the base of the vehicle brake pedal.

The present invention is also directed to a vehicle pedal sensor assembly for use in a vehicle brake pedal including a base, a pedal arm pivotally mounted for movement relative to the base, and springs extending between the pedal arm and the base of the vehicle brake pedal, the vehicle sensor assembly comprising a pedal force sensor on the base of the vehicle brake pedal, and a pedal force application member operably coupled to the springs and in abutting relationship with the pedal force sensor, the springs being adapted to directly or indirectly exert a force against the pedal force application member in response to the movement of the pedal arm, the pedal force application member being adapted to exert a force against the pedal force sensor in response to the change in the position of the pedal arm for determining the position of the pedal arm.

In one embodiment, the base of the vehicle brake pedal defines a through-aperture and further comprising a pedal force sensor housing located on a back side of the base of the vehicle brake pedal and defining an interior receptacle for the pedal force sensor, the pedal force application member extending in the through-aperture defined in the base of the vehicle brake pedal and the interior receptacle defined in the pedal force sensor housing.

In one embodiment, the springs are located in a spring housing, the spring housing being operably coupled to the pedal force application member.

In one embodiment, a pin couples the spring housing to the pedal force application member.

In one embodiment, the pedal force sensor comprises a piezoelectric element, a load cell, or a strain gauge.

In one embodiment, the sensor assembly further comprises a sensor housing, the pedal force sensor and the pedal force application member extending in the sensor housing.

In one embodiment, the sensor assembly further comprises a non-contacting position sensor assembly including a Hall Effect position sensor in the sensor housing and a magnet coupled to the pedal arm, the Hall Effect position sensor sensing a change in the magnitude and/or direction of the magnetic field generated by the magnet in response to a change in the position of the pedal arm for determining the position of the pedal arm.

Other advantages and features of the present invention will be more readily apparent from the following detailed description of the preferred embodiments of the invention, the accompanying drawings, and the appended claims.

BRIEF DESCRIPTION OF THE DRAWINGS

These and other features of the invention can best be understood by the description of the accompanying FIGS. as follows.

DESCRIPTION OF THE EMBODIMENTS

FIGS. 1-8 depict a vehicle brake pedal 10 incorporating a position and force sensor assembly 100 in accordance with the present invention.

Figures 1, 2:
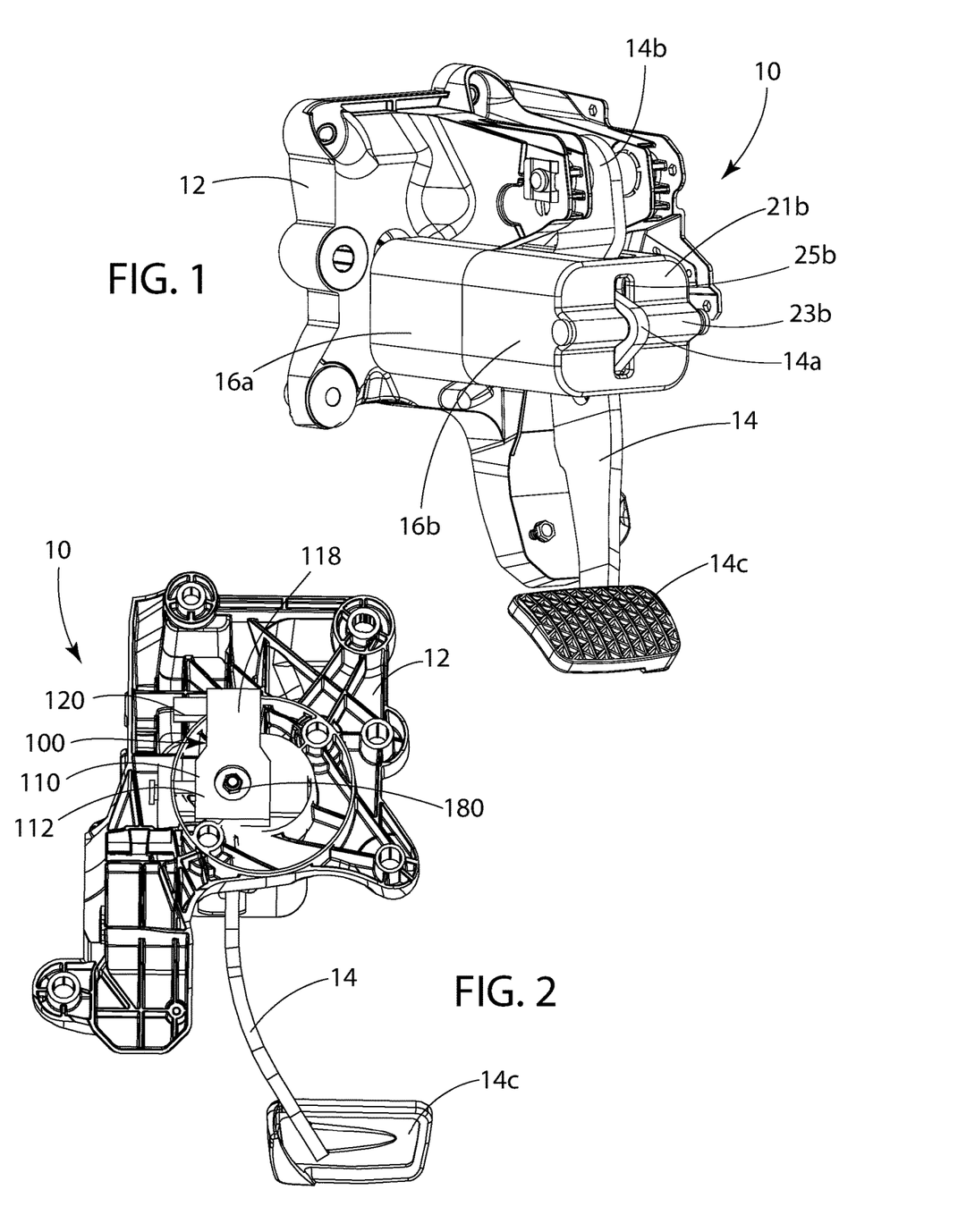
FIG. 1 is a front perspective view of a brake-by-wire vehicle brake pedal incorporating a position and force sensor assembly in accordance with the present invention.
FIG. 2 is a back perspective view of the brake pedal shown in FIG. 1.
Figure 3:
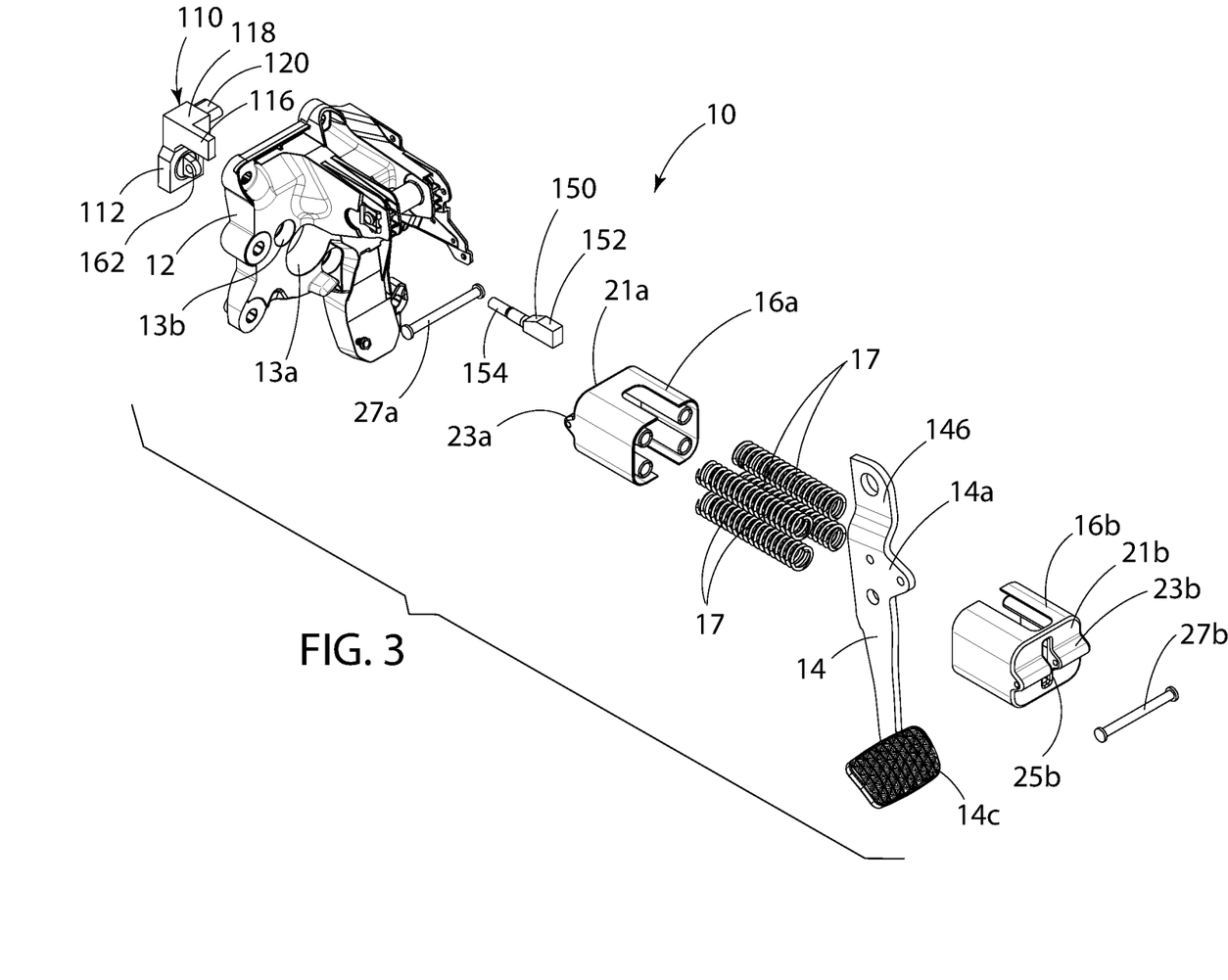
FIG. 3 is an exploded perspective view of the brake pedal shown in FIG. 1.

The vehicle brake pedal 10 includes a generally vertically extending base 12 defining at least a pair of through-apertures or holes 13a and 13b, an elongate brake pedal arm 14 pivotally connected for clockwise and counterclockwise rotation relative to, and in a direction towards and away from, the pedal base 12, and a pack of elongate helical springs 17 extending between, and in a relationship generally normal to, the pedal base 12 and the pedal arm 14.

The springs 17 are housed in a cavity or receptacle defined by the interior of a pair of telescoping and movable opposed spring housing members 16a and 16b. A first distal end of each of the springs 17 abuts against an interior surface of a back wall 21b of the spring housing member 16b. A second opposed distal end of each of the springs 17 abuts against an interior surface of a back wall 21a of the spring housing member 16a.

The spring housing members 16a and 16b include respective elongate pin sleeves 23a and 23b formed on and projecting outwardly from the exterior surface of the respective back walls 21a and 21b thereof. The spring housing member 16b additionally defines a slot 25b that extends through the back wall 21b and cuts through the sleeve 23b.

Respective elongate pins 27a and 27b are fitted and extend through the respective sleeves 23a and 23b.

The brake pedal arm 14 additionally defines a bracket 14a extending through the slot 25b defined in the back wall 21b of the spring housing member 16b. The pin 27b extends through the bracket 14a.

Figure 7:
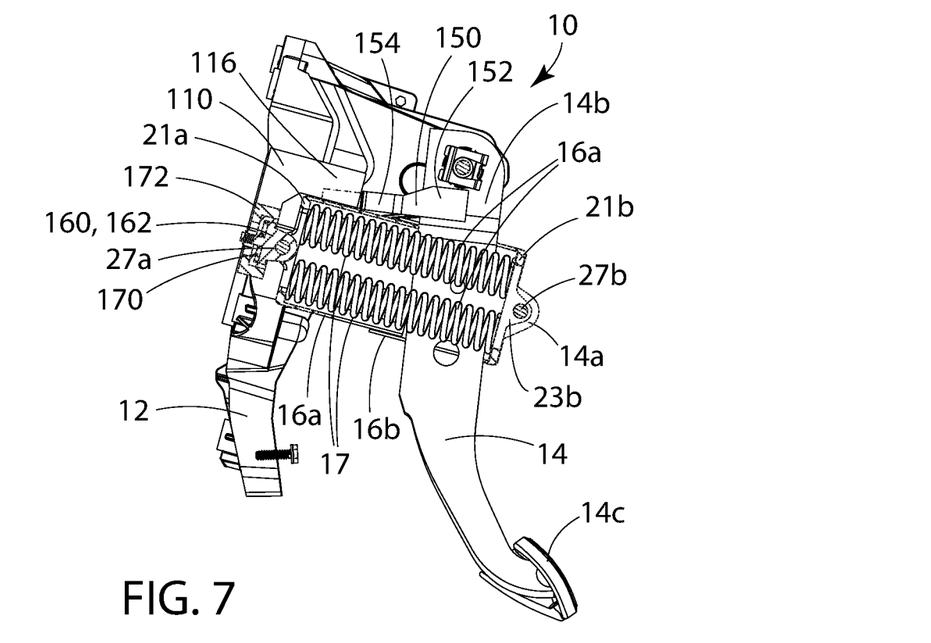
FIG. 7 is a part vertical cross-sectional, part side elevational view of the brake pedal shown in FIG. 1 in its disengaged or rest position.
Figure 8:
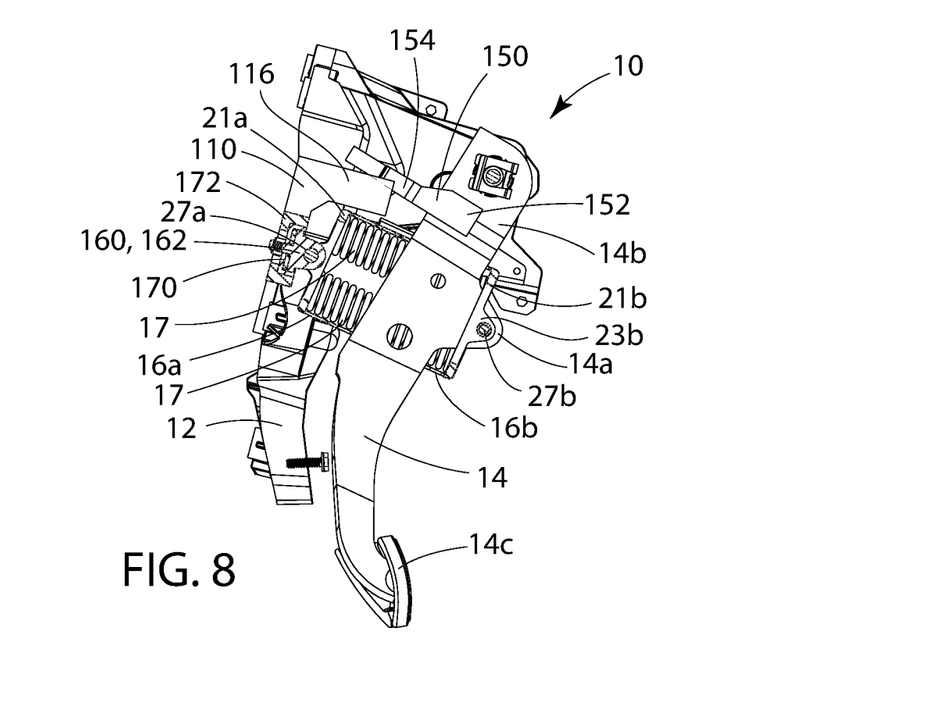
FIG. 8 is a part vertical cross-sectional, part side elevational view of the brake pedal shown in FIG. 8 in its engaged or braking position.
Figure 9:
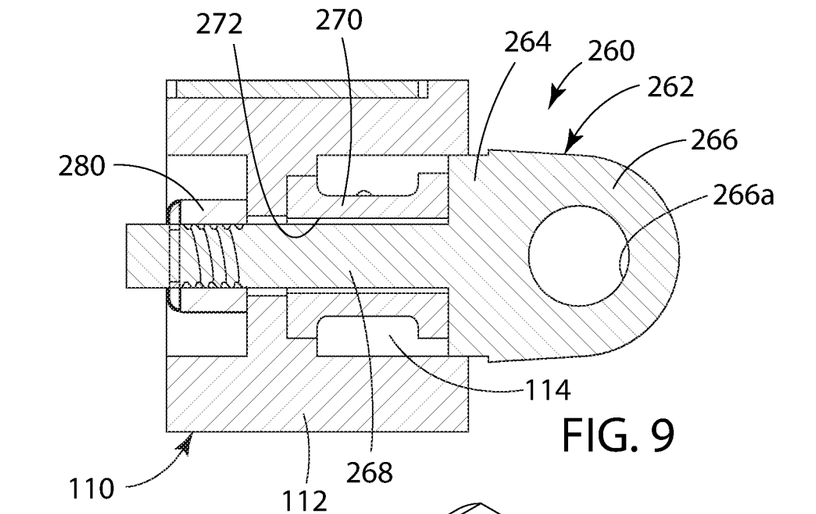
FIG. 9 is an enlarged vertical cross-sectional view of a load cell force sensor embodiment in accordance with the present invention.

Thus, as shown in FIGS. 7 and 8, the pin 27b couples the brake pedal arm 14 to the spring housing member 16b which in turn couples the spring housing member 16b for back and forth movement in response to the back and forth movement of the brake pedal arm 14.

Figure 4:
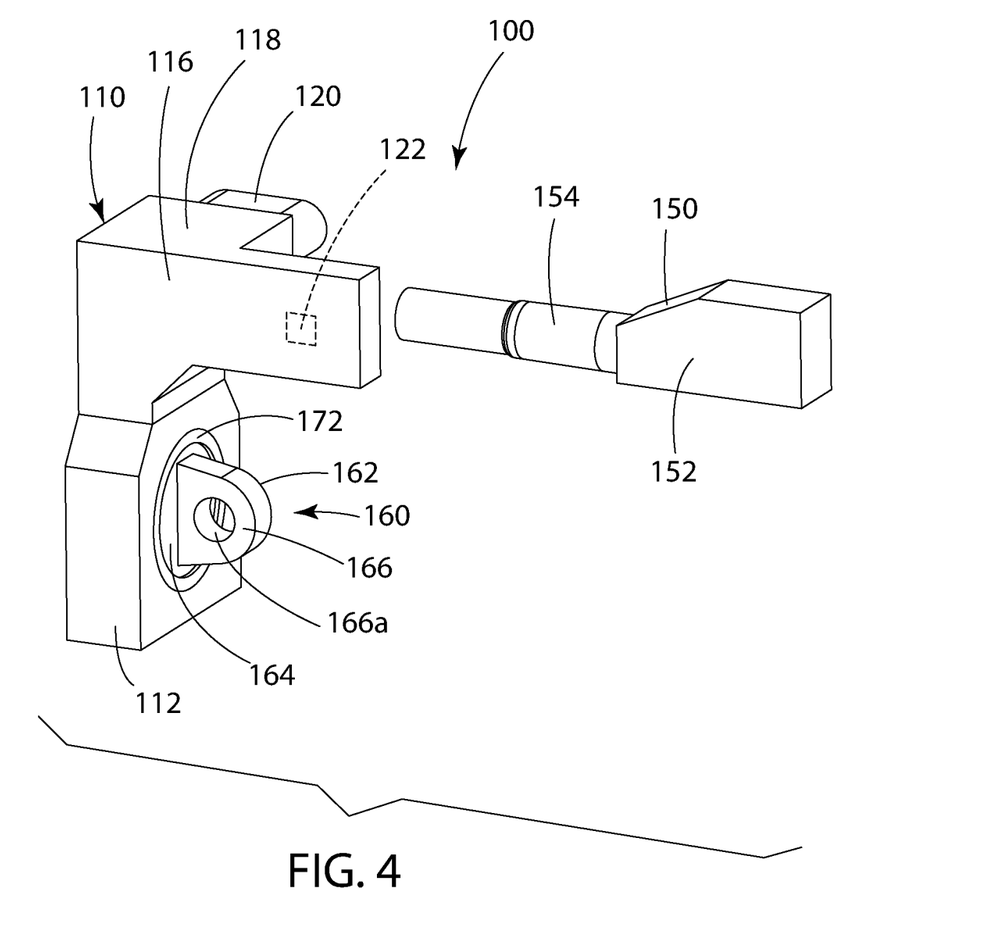
FIG. 4 is an enlarged perspective view of the position and force sensor assembly of the present invention.

The position and force sensor assembly 100 of the present invention comprises both a contacting force sensor assembly 160 located in a sensor housing 110 and a non-contacting position sensor assembly including a Hall Effect sensor 122 located in the sensor housing 110 and a magnet assembly 150 mounted to the brake pedal arm 14.

Figure 5:
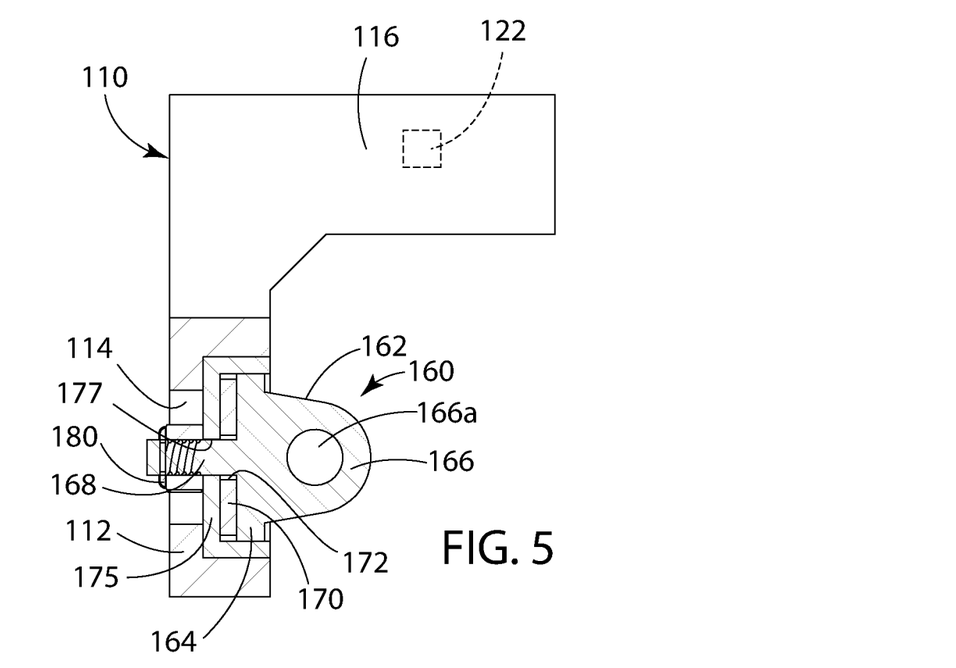
FIG. 5 is a part vertical cross-sectional, part side elevational view of the housing of the position and force sensor assembly shown in FIG. 4.
Figure 6:
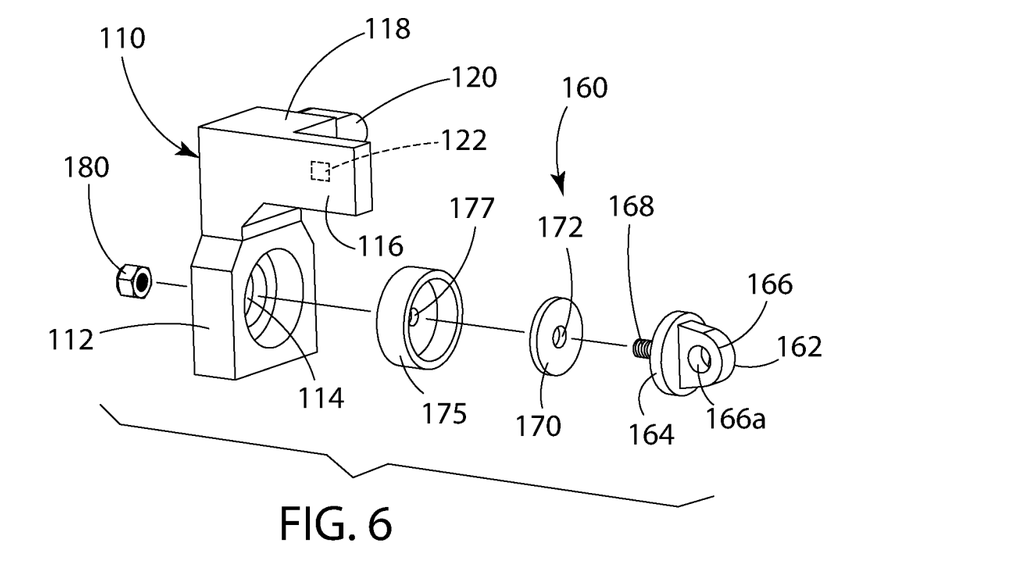
FIG. 6 is an enlarged exploded perspective view of the housing of the position and force sensor assembly shown in FIG. 4.

The sensor housing 110 includes a base 112 defining an interior through-aperture or hole 114, a first elongate arm 116 unitary with, and extending in a relationship generally normal to, the base 112, and a second arm 118 unitary with both the base 112 and the first arm 116 and extending in a generally normal relationship relative to the first arm 116.

In the embodiment of FIGS. 5 and 6, the base 112 and the first arm 116 together define a generally L-shaped sensor housing 110.

An electrical connector 120 protrudes and extends unitarily outwardly from a distal end of the second arm 118.

A Hall Effect or the like position sensor 122 together with other suitable associated electronic circuitry (not shown) is housed in the interior of the arm 116 of the sensor housing 110.

The base 112 of the sensor housing 110 houses a force sensor assembly 160 that comprises a force application member or piston or plunger or element 162 including a head in the form of a flat generally ring shaped plate 164, a bracket 166 extending generally outwardly from an exterior face of the plate 164 and defining a through-hole 166a, and an elongate threaded shaft or bolt 168 protruding and extending generally normally outwardly from an exterior face of the plate 164 opposite the exterior face thereof including the bracket 166.

The force sensor assembly 160 also comprises a force sensor 170 and a force sensor jacket or receptacle or holder 175 defining a central through-hole 177. In the embodiment shown, the force sensor 170 is generally ring shaped and defines a central through aperture 172. In one embodiment, the force sensor 170 may take the form of a ring shaped piezoelectric element composed of ceramic or the like piezoelectric material.

Referring to FIGS. 5 and 6 in particular, the force sensor 170 is mounted in the holder 175 and the holder 175 with the force sensor 170 are located and mounted in the receptacle or cavity 114 defined in the interior of the base 112 of the sensor housing 110.

The force application member 162 is located in and extends into the interior cavity 114 of the base 112 of the sensor housing 110 in a relationship with the exterior face of the plate or head 164 in direct abutting contact with and against an exterior face of the force sensor 170. The shaft or bolt 168 of the force application member 162 extends through the respective through-holes 172 and 177 defined in the force sensor 170 and the holder 175 respectively. A nut 180 is secured to a distal end of the shaft 168 of the force application member 162 for securing and retaining the force sensor 170 in the interior of the base 112 of the sensor housing 110 and applying a pre-load force on the force sensor 170.

Although not described herein in any detail or shown in the FIGS., it is understood that the interior of the sensor housing assembly 110 contains and houses both force sensor and position sensor circuitry adapted for coupling to electrical terminals extending through the connector 120 and into the interior of the sensor housing 110.

With reference to FIGS. 2, 3, 7, and 8, the sensor housing 110 is coupled to the base 12 of the brake pedal 10 in a relationship with the sensor housing 110 abutted against a back exterior face of the base 12 of the brake pedal 10, the bracket 166 of the force application member 162 extending through the through-aperture or hole 13a defined in the base 12 of the brake pedal 10, the first arm 116 extending through the through-aperture or hole 13b defined in the base 12 of the brake pedal 10, and the pin 27a extending through the through-aperture 166a defined in the bracket 166 of the force member 162 and the sleeve 23a of the spring housing member 16a for coupling the force application member 162 to the spring housing member 16a and in turn then coupling the force application member 162 to the springs 17 and the brake pedal arm 14 for movement in response to the movement of the brake pedal arm 14.

As discussed above, the position and force sensor assembly 100 also comprises the magnet assembly 150 shown in for example FIGS. 3, 4, 7, and 8. The magnet assembly 150 includes a base 152 and an elongate rod shaped magnet 154 extending outwardly from the base 152. The magnet assembly 150, and more specifically the base 152 thereof, is mounted to an upper end 14b of the brake pedal arm 14 opposite the lower end thereof including the brake pedal pad 14c in a relationship with the rod shaped magnet 154 extending generally normally outwardly from the brake pedal arm 14 in the direction of the base 12 of the brake pedal 10 and in a relationship and position generally opposite and spaced from and not in contact with the arm 116 of the force and position sensor assembly 110.

The operation of the brake pedal 10, and more specifically the operation of the force and position sensor assembly 100 of the present invention, will now be described with reference to FIGS. 7 and 8.

FIG. 7 shows the brake pedal 10, and more specifically the brake pedal 14 thereof, in its disengaged or rest position with no braking force applied to the brake pedal 14.

FIG. 8 shows the brake pedal 10, and more specifically the brake pedal 14 thereof, in its engaged, depressed, braking position following the pivotal clockwise movement of the brake pedal 14 in the direction towards the base 12 of the brake pedal 10 in response to the application of a foot force against the pedal foot pad 14c.

More specifically, as shown in FIG. 8, and as a result of the coupling of the brake pedal arm 14 to the spring housing member 16b via the coupling pin 27b, the depression or engagement of the brake pedal 10 and the resultant clockwise rotation thereof, causes the inward movement of the spring housing member 16b in the direction of the base 12 of the brake pedal 10.

The inward movement of the spring housing member 16b in turn results in the compression of the springs 16a housed therein which in turn causes the distal end of the springs 16a to exert a force against the back wall 21a of the spring housing member 16a which in turn results in the inward movement of the spring housing member 16a.

Thereafter, in accordance with the present invention, and by virtue of the coupling of the spring housing member 16a to the bracket 166 of the force application member 162 via the pin 27a, the inward movement of the spring housing member 16a, and more specifically the inward movement of the back wall 21a thereof in the direction of the base 12 of the brake pedal 10, results in the inward movement of the force application member 162 which causes the plate 164 of the force application member 162 to exert a force against the sensor 170 thereby resulting in a deformation or bending or compression of the sensor 170.

The deformation or bending or compression of the sensor 170, i.e., the change in the shape or thickness of the sensor 170, generates a change in one or more of the electrical properties of the sensor 170 which change is sensed by electronic circuitry associated with the sensor 170 and housed within the interior of the sensor housing 110 to allow the determination and measurement of the position of the brake pedal arm 14 and initiate a response such as, for example, the braking of a vehicle and activation of the vehicle brake lights.

As also shown in FIG. 8, the movement of the brake pedal arm 14 in the direction of the base 12 of the brake pedal 10 also causes the movement of the magnet member 150, and more specifically the movement of the magnet 154 thereof relative to the position sensor arm 116 and, still more specifically, the movement of the magnet 154 relative to the Hall Effect sensor 122 located in the interior of the arm 116 of the sensor housing 110 which in turn results in a change in the magnitude and/or direction of the magnetic field generated by the magnet 154 which change is sensed by the Hall Effect sensor 122 and used to generate electrical signals which, via suitable electronic circuitry associated therewith and housed in the interior of the arm 116 of the sensor housing 110, also allows for the determination and measurement of the position of the brake pedal arm 14 and initiate a response such as for example the braking of a vehicle and activation of the vehicle brake lights.

In accordance with the present invention, the incorporation of both a contacting force sensor assembly 160 and a non-contacting position sensor assembly 122, 150 in the brake pedal 10 allows for redundant measurements of the position of the brake pedal arm 14 and, more specifically, allows for the measurement of the position of the brake pedal arm 14 and thus braking of the vehicle even if the force sensor assembly 160 or the position sensor assembly 122, 150 becomes inoperable.

Moreover, the use of both a contacting force sensor assembly 160 and a non-contacting position sensor assembly 122, 150 in the brake pedal 10 allows for the detection and measurement of brake pedal positions of differing magnitudes depending on a particular application or need.

For example, the force sensor 170, by virtue of its direct contact with the brake pedal arm 14 via the spring housings 16a and 16b and further by virtue of its direct contact with the force application member 162, allows for the detection and measurement of changes in the position of the brake pedal arm 14 that may not be otherwise be detectable by the non-contacting position sensor assembly 122, 150.

Numerous variations and modifications of the brake pedal sensor assembly 100 of the present invention as described above may be effected without departing from the spirit and scope of the novel features of the invention. It is to be understood that no limitations with respect to the specific brake pedal sensor assembly 100 illustrated herein are intended or should be inferred. It is, of course, intended to cover by the appended claims all such modifications as fall within the scope of the claims.

Figure 10:
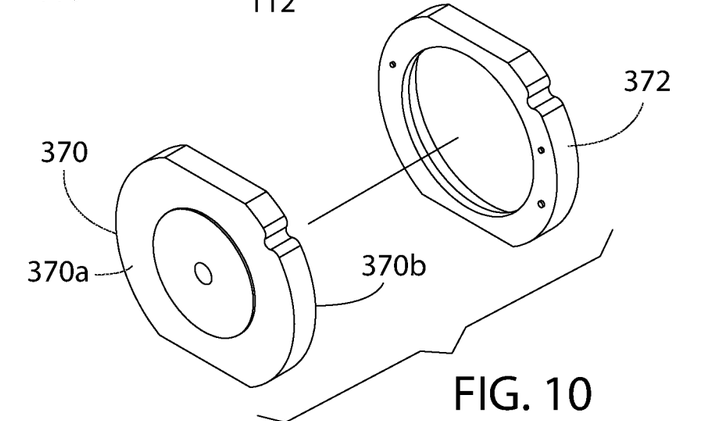
FIG. 10 is an exploded perspective view of a strain gauge force sensor embodiment in accordance with the present invention.
Figure 11:
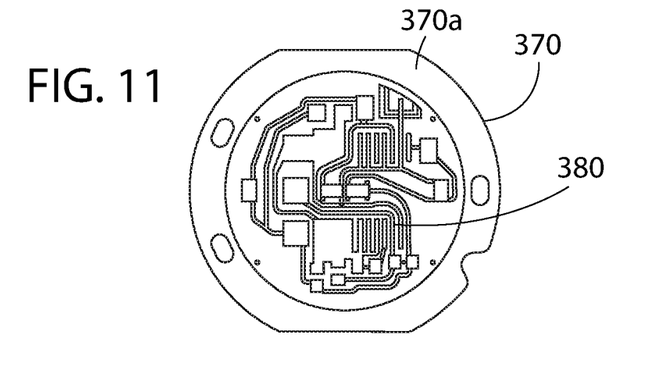
FIG. 11 is a side elevational view of the strain gauge force sensor shown in FIG. 10.

For example, it is understood that the force sensor assembly 160 and in particular the force sensor 170 thereof may be one of several different embodiments depending upon the particular application including, for example, the force sensor assembly embodiment 260 and I-beam shaped load cell embodiment 270 shown in FIG. 11 and the strain gauge embodiment 370 shown in FIGS. 10 and 11.

Referring to FIG. 11, the force sensor assembly 260 comprises a force application member or plunger or piston or element 262 including a head in the form of a flat generally ring shaped plate 264, a bracket 266 extending generally outwardly from an exterior face of the plate 264 and defining a through-hole 266a, and an elongate threaded shaft or bolt 268 protruding and extending generally normally outwardly from the exterior face of the plate 264 opposite the exterior face thereof including the bracket 266.

The force sensor assembly 260 also comprises a force sensor 270 which, in the embodiment is in the form of an I-beam shaped load cell defining a central through-hole or aperture 273.

The I-beam shaped load cell 270 is mounted in the receptacle or cavity 114 defined in the interior of the base 112 of the sensor housing 110.

The force application member 262 is coupled to and mounted to the base 112 of the sensor housing 110 in a relationship with an exterior face of the head 264 thereof abutted against the exterior face of the I-beam load cell 270 and with the shaft or bolt 268 thereof extending through the respective through-holes 272 and 114 defined in the load cell 270 and the base 212 respectively and terminating in an end extending outwardly from the base 212 of the sensor housing 210. A nut 280 is secured to the distal end of the shaft 268 of the force member 262 for securing the load cell 270 in the sensor housing base 112 and applying a pre-load force on the load cell 270.

FIGS. 10 and 11 depict a strain gauge force sensor embodiment 370 in the form of a disc adapted to be mounted within the interior of a ring shaped holder 372 and then subsequently mounted into the interior of the base 112 of the sensor housing 110 as described above with respect to the force sensor 170, the description of which is incorporated herein by reference.

In accordance with this embodiment, the strain gauge 370 includes opposed exterior faces 370a and 370b with the exterior surface 370b adapted for direct abutting contact with and against the head 164 of the force application member 166 and the opposed exterior surface 370a including electronic circuitry 380 adapted for sensing and measuring the magnitude and/or location of strains in the strain gauge 370 in response to the application of a direct contact force thereto by the force application element 166.

Still further, it is understood that the present invention includes embodiments, depending on the application, including only the contacting force sensor assemblies for measuring the position of the brake pedal.

What is claimed is:

1. A vehicle pedal sensor for use in connection with a vehicle pedal and comprising:
   a sensor housing coupled to the vehicle pedal, the sensor housing including a base with a vehicle pedal force sensor and an arm unitary with the base of the sensor housing and including a vehicle pedal position sensor for sensing a change in the position of the vehicle pedal; and
   a pedal force application member operably coupled to the vehicle pedal and adapted to exert a force against the vehicle pedal force sensor in the base of the sensor housing in response to the change in the position of the vehicle pedal.

2. The vehicle pedal sensor of claim 1 wherein the vehicle pedal position sensor comprises a Hall-Effect integrated circuit in the arm of the sensor housing and a magnet associated with the vehicle pedal, the Hall-Effect integrated circuit sensing a change in the magnetic field generated by the magnet in response to the change in the position of the vehicle pedal.

3. The vehicle pedal sensor of claim 1 wherein the vehicle pedal force sensor includes a piezoelectric element, a load cell, or a strain gauge located in the base of the sensor housing.

4. The vehicle pedal sensor of claim 1 wherein the vehicle pedal is a vehicle brake pedal.

5. A vehicle pedal sensor for use in connection with a vehicle brake pedal and comprising:
   a sensor housing coupled to the vehicle brake pedal, the sensor housing including a base with a vehicle brake pedal position sensor and an arm unitary with the base of the sensor housing and including a vehicle brake pedal force sensor;
   an electrical connector unitary with the sensor housing;
   a magnet associated with the vehicle brake pedal position sensor and coupled to the vehicle brake pedal, the vehicle brake pedal position sensor sensing a change in the magnetic field generated by the magnet in response to a change in the position of the vehicle brake pedal; and
   a pedal force application member operably coupled to the vehicle brake pedal and adapted to exert a force against the vehicle brake pedal force sensor in the base of the sensor housing in response to the change in the position of the vehicle brake pedal.

6. The vehicle pedal sensor of claim 5 wherein the vehicle brake pedal force sensor includes a piezoelectric element, a load cell, or a strain gauge located in the base of the sensor housing.

7. The vehicle pedal sensor of claim 5 wherein the vehicle brake pedal position sensor includes a Hall-Effect integrated circuit in the arm of the sensor housing for sensing the change in the magnetic field generated by the magnet associated with the vehicle brake pedal position sensor and coupled to the vehicle brake pedal in response to the change in the position of the vehicle brake pedal.

* * * * *